Feb. 7, 1950 E. EBERHARD 2,496,909

PULSE AMPLITUDE DISCRIMINATION

Filed Oct. 1, 1947

INVENTOR
Everett Eberhard
BY J. L. Whittaker
ATTORNEY

Patented Feb. 7, 1950

2,496,909

UNITED STATES PATENT OFFICE 2,496,909

PULSE AMPLITUDE DISCRIMINATION

Everett Eberhard, Haddonfield, N. J., assignor to Radio Corporation of America, a corporation of Delaware Application October 1, 1947, Serial No. 777,193

5 Claims. (Cl. 250—27)

This invention relates to pulse amplitude discriminator circuits, and more particularly to circuits providing output pulses whose polarity depends upon the amplitude of input pulses applied thereto.

The principal object of the invention is to provide a circuit of the described type capable of distinguishing sharply between input pulses in accordance with the differences of their amplitudes from a predetermined value.

Another object is to provide a pulse amplitude discriminator circuit which produces output pulses whose wave form is approximately the same as that of the input pulses.

Figure 1:
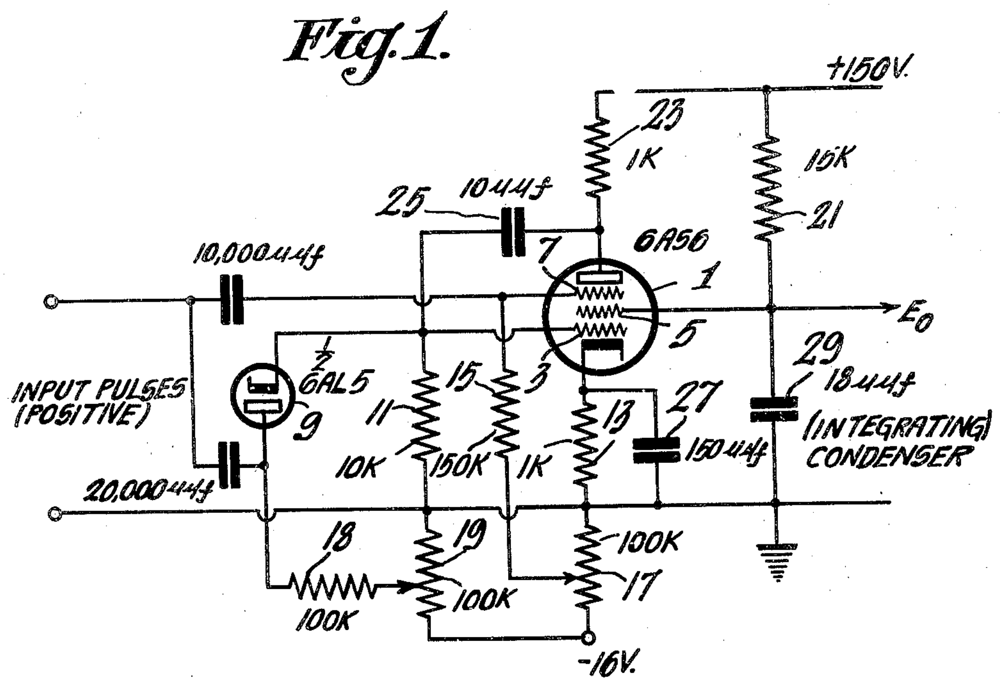
Figures 2, 3, 4:
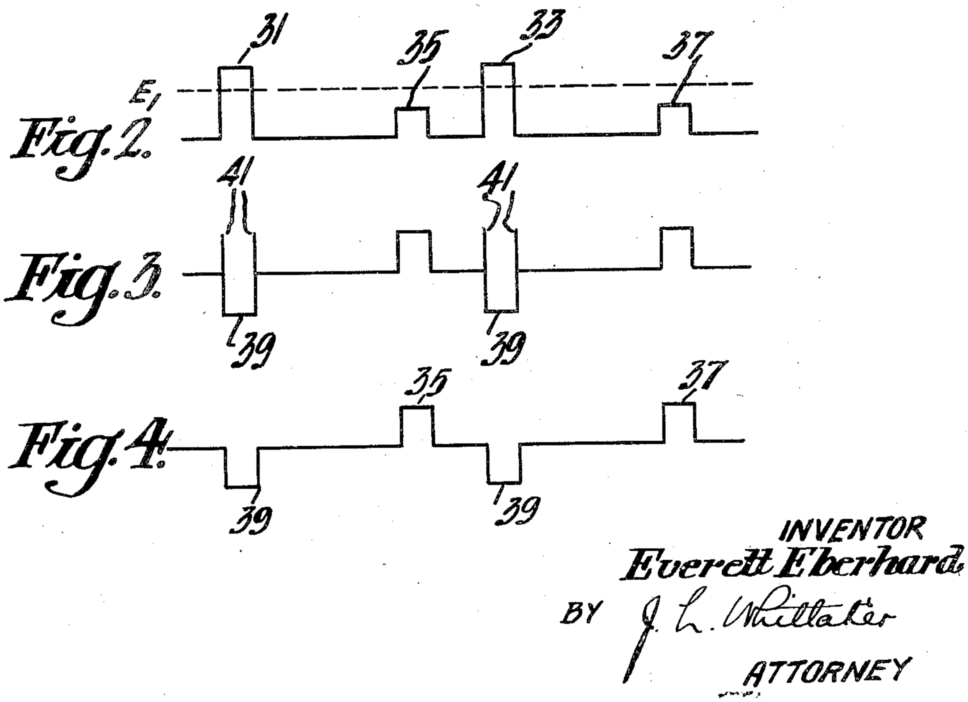

The invention will be described with reference to the accompanying drawing, wherein:

Fig. 1 is a schematic circuit diagram of a preferred embodiment of the invention, Fig. 2 is an oscillogram of a typical input pulse train including pulses above and below a predetermined amplitude, Fig. 3 is an oscillogram showing what the performance of the circuit of Fig. 1 would be like if certain of the elements thereof were omitted, and Fig. 4 is an oscillogram of the output of the circuit of Fig. 1 in response to the input shown in Fig. 2.

Similar reference characters are applied to similar elements throughout the drawings.

The terms "positive" and "negative" as applied to pulses herein refer to the polarity with reference to the A.-C. axis. For example, suppose a point to be at a potential of plus fifty volts with respect to ground. If the potential drops momentarily to plus thirty volts, a negative pulse has occurred at that point, even though the absolute potential has remained positive throughout.

The fundamental principle of the subject invention is that of mixing the outputs of two amplifiers, one of which has low gain and provides positive output pulses, the other having high gain and providing negative output pulses. The high gain amplifier is biassed so as to provide no output until the input pulse passes the level about which discrimination is to occur.

In the system of Fig. 1 both of the above described amplifier functions are performed by a single tube 1. The tube 1 is a pentode, and may be of the type known in the radio art as a 6AS6. It includes a control grid 3, a screen grid 5, and a suppressor grid 7. Input pulses are applied directly to the grid 7, and through a diode 9 to the grid 3. The grid 3 is returned to ground through a leak resistor 11. Bias is provided by a resistor 13 in the cathode circuit of the tube 1. The grid 7 is returned through a resistor 15 to a point which is negative with respect to ground, on a voltage divider 17.

The diode 9 is poled to allow conduction only in the direction of the grid 3. The anode of the diode 9 is biassed negative with respect to ground by a voltage applied to it through a resistor 18 from a point on a voltage divider 19.

The grid 5 of the tube 1 is used as an anode, and is provided with a load resistor 21. The output of the circuit is taken from the grid 5. The plate of the tube 1 is provided with a relatively low resistance load resistor 23, and is coupled to the grid 3 through a capacitor 25. The last two elements constitute a negative feedback path whose purpose will be described later.

Negative feedback or degeneration is also provided by the cathode resistor 13, which is only partially by-passed by a capacitor 27. A small integrating condenser 29 is connected across the output terminals of the circuit. The various circuit constants shown in the drawing are substantially those which are preferred at present, although others may be used.

In the operation of the system of Fig. 1, positive input pulses are applied to the grid 7 and to the anode of the diode 9. The potential at the anode of the diode 9 is adjusted by means of the voltage divider 19 to a negative value whose magnitude is substantially equal to the (positive) input level $E_1$ where discrimination takes place.

Referring to Fig. 2, input pulses 31 and 33 are above the level $E_1$, and pulses 35 and 37 are below the level $E_1$. Each positive pulse reaching the grid 7 tends to make the potential of the grid 5 go in a positive direction. This occurs because some of the electrons that would otherwise strike the grid 5 are attracted through grid 7 to the plate; the current drawn by the grid 5 is reduced, and so is the drop in the load 21.

Each positive pulse reaching the grid 3 makes the potential of the grid 5 go in the negative direction because the grid 3, in going less negative, allows more electrons to pass through it and hence more electrons reach the grid 5. This makes more current flow to the grid 5, increasing the voltage drop in the resistor 21.

The effect of the grid 3 on the current drawn by the grid 5 is considerably greater than that of the grid 7, because the grid 3 is inside, i. e. closer to the cathode than the grid 5. Thus whenever an input pulse reaches both grids 3 and 7, the grid 5 will go negative and provide a negative output pulse.

The diode 9 prevents input pulses of magnitude less than $E_1$ from reaching the grid 5. Consequently, lower magnitude pulses, such as the pulses 35 and 37 in Fig. 2, will act only on the grid 7 and produce positive output pulses at the grid 5. Higher magnitude input pulses such as the pulses 31 and 33 of Fig. 2 will tend to drive the grid 5 positive, owing to the action of the grid 7, but will tend more strongly to drive the grid 5 negative by way of the grid 3. The result is the difference of these two effects, a negative output pulse.

Although the edges of the pulses in Fig. 2 are shown vertical, it will be understood that any pulse requires a certain amount of time to build up and also to decay. In other words, both the front and back edges slope to some extent, however small, so that the shape of a nominally "square" pulse is in fact slightly trapezoidal. This means that before the input potential can reach a value in excess of $E_1$, it must first have a value less than $E_1$. As already explained, the output is positive when the input is less than $E_1$, and negative when the input is greater than $E_1$. Thus, unless something is done to prevent it, the high amplitude input pulses will provide negative pulses 39 as shown in Fig. 3, each preceded and followed by a positive "spike" 41.

The aforementioned negative feedback elements minimize or prevent the production of the "spikes" 41. The voltage drop across the cathode resistor 13 depends upon the total space current, or cathode current drawn by the tube 1. Since the resistor 13 is only partially by-passed by the condenser 27, this voltage tends to follow instantaneous values of the lower frequency components in the variation of the space current, but not the higher frequency components. The total space current is the sum of the currents drawn by the grid 5 and the plate of the tube 1. It depends primarily upon the potential of the grid 3 with respect to the cathode; the principal effect of the outer grid 7 is to control the division of current between the grid 5 and the plate.

Since the grid 5 is not by-passed to ground, it does not function as a screen. When a positive input pulse reaches the outer grid 7, the grid 3 also goes positive momentarily, owing to interelectrode capacitance between the grids 7 and 3 and interelectrode capacitance through the diode 9. The space current increases, but the cathode does not go proportionately positive, because a short interval is required to alter the voltage across the capacitor 27. During this short interval, the grid 3 acts to make the grid 5 tend to go negative, at the same time as the grid 7 is trying to make it go positive. Thus the "spike" 41 at the leading edge of the output pulse is minimized.

By the time the input pulse has reached the level $E_1$, the condenser 27 has charged and the cathode potential catches up with the voltage reaching the grid 3 by the interelectrode capacitance from the grid 7 and the interelectrode capacitance through the diode. If the pulse never reaches the value $E_1$, like the pulses 35 and 37 in Fig. 2, the above action simply delays the beginning of the positive output pulse by an infinitesimal amount.

The drop in the resistor 23 depends only upon the plate current drawn by the tube 1, and its instantaneous value varies with variations in said current. The capacitor 25 is so small, however, that only the higher frequency components can get to the grid 3. During the initial build-up of the input pulse, the plate current increases momentarily while the grid 3 goes positive; this makes the plate potential decrease and so applies a negative voltage to the grid 3, in opposition to that which reaches it by internal capacitance as described above. The effect of the latter is much greater, so the operation at the beginning of the input pulse is substantially as already described.

At the trailing edge of the input pulse, the plate current decreases rapidly as the voltages at both grids 3 and 7 go in the negative direction. The plate potential accordingly goes positive, applying a sharp positive pulse through the capacitor 25 to the inner grid 3. This tends to make the grid 5 go negative, thus effectively cancelling the trailing edge "spike" 41 on the output pulse. When the input pulse is of low amplitude, less than $E_1$ the effect is to cut off the trailing edge of the output pulse somewhat more sharply than the input pulse decay. The degenerative cathode circuit net work has little effect at the trailing edge of the input pulse, since it acts merely to keep the cathode potential from decreasing quite as rapidly as the plate potential, and to that extent it makes the trailing edge of the output pulse cut off more sharply.

The capacitor 29 integrates the output pulses slightly, rounding off the corners by by-passing some of the high frequency components. In so doing it helps to remove any residual "spikes," since these are averaged or integrated by storage in the capacitor. It has been found that the circuit will operate satisfactorily for some purposes if the negative feedback elements are omitted provided the integrating capacitor 29 is used.

Fig. 4 shows the train of output pulses provided by the circuit of Fig. 1 in response to the input pulses of Fig. 2. With the circuit constants shown in the drawing, the circuit of Fig. 1 will give adequate separation between pulses having peak values of 9 and 12 volts respectively, and pulse widths of the order of two microseconds.

I claim as my invention:

1. A pulse amplitude discriminator including an electron discharge tube having at least a cathode, an anode, a control grid, a screen grid, and a suppressor grid, a circuit for applying energizing potential to the anode, means for applying input pulses to said suppressor grid, further means for applying said input pulses to said control grid, said last mentioned means including a peak clipper which passes only that portion of an input pulse which is of more than a predetermined magnitude and a load resistor connected to said screen grid.

2. The invention as set forth in the foregoing claim, including a degenerative network in the cathode circuit of said tube comprising a resistor and a capacitor shunting said resistor, the capacitance of said capacitor being so proportioned with respect to the resistance of said resistor as to minimize the magnitude of positive going spikes adjacent negative going pulses in the output across said load resistor.

3. The invention as set forth in claim 2 including a feedback network between said anode and said control grid, comprising a resistor connected between said anode and said circuit for applying potential to it, a resistor connected from said control grid to ground, and a capacitor connected from said anode to said control grid.

4. The invention as set forth in claim 3, including a capacitor connected from said screen grid to ground.

5. The invention as set forth in claim 1, wherein said peak clipper comprises a diode connected to said control grid to pass current produced by said input pulses only in the direction of said control grid, and means for biasing the anode of said diode negatively with respect to ground by a voltage of said predetermined magnitude.

EVERETT EBERHARD.

REFERENCES CITED

The following references are of record in the file of this patent:

UNITED STATES PATENTS

| Number | Name | Date |
| --- | --- | --- |
| 1,756,893 | Warner | Apr. 29, 1930 |
| 1,975,143 | Farnsworth | Oct. 2, 1934 |